United States Patent
Hodowanec et al.

(10) Patent No.: US 9,543,809 B2
(45) Date of Patent: Jan. 10, 2017

(54) RADIAL VENT COMPOSITE HEAT PIPE

(71) Applicant: HPEV, Inc., Wesley Chapel, FL (US)

(72) Inventors: Mark Hodowanec, Murrysville, PA (US); Timothy J. Hassett, Santa Rosa, CA (US)

(73) Assignee: HPEV, Inc., Wesley Chapel, FL (US)

( * ) Notice: Subject to any disclaimer, the term of this patent is extended or adjusted under 35 U.S.C. 154(b) by 466 days.

(21) Appl. No.: 14/188,847

(22) Filed: Feb. 25, 2014

(65) Prior Publication Data

US 2014/0239756 A1    Aug. 28, 2014

Related U.S. Application Data

(60) Provisional application No. 61/768,680, filed on Feb. 25, 2013.

(51) Int. Cl.
| | |
|---|---|
| *H02K 9/00* | (2006.01) |
| *H02K 9/20* | (2006.01) |
| *H02K 1/20* | (2006.01) |
| *F28D 15/02* | (2006.01) |
| *F28F 1/30* | (2006.01) |

(52) U.S. Cl.
CPC ............ *H02K 9/20* (2013.01); *F28D 15/0233* (2013.01); *F28D 15/0275* (2013.01); *F28F 1/30* (2013.01); *H02K 1/20* (2013.01); *F28D 2015/0216* (2013.01)

(58) Field of Classification Search
CPC .................................... H02K 9/00; H02K 9/19
USPC ......... 310/52, 53, 54, 55, 56, 57, 58, 59, 64
See application file for complete search history.

(56) References Cited

U.S. PATENT DOCUMENTS

| | | | | |
|---|---|---|---|---|
| 1,378,673 | A * | 5/1921 | Graton | B42D 25/29 283/103 |
| 2,099,575 | A * | 11/1937 | Savage | H02K 9/19 165/47 |
| 3,715,610 | A * | 2/1973 | Brinkman | H02K 9/20 165/104.25 |
| 3,801,843 | A * | 4/1974 | Corman | F28D 15/0275 165/104.25 |
| 6,339,269 | B1 * | 1/2002 | Hsiao | F28D 15/04 310/60 A |

(Continued)

FOREIGN PATENT DOCUMENTS

| | | | |
|---|---|---|---|
| JP | 62262633 | A * | 11/1987 |
| JP | 2010154713 | A * | 7/2010 |

*Primary Examiner* — Jose Gonzalez Quinones
(74) *Attorney, Agent, or Firm* — Polster Lieder

(57) ABSTRACT

A radial vent composite heat pipe system for cooling and increasing the power density of an electrical machine is provided. The system comprises a plurality of radial vent composite heat pipe assemblies each comprising a slot portion thermally connected to a vent portion. The slot portions are disposable within respective stator slots of a stator core pack of a stator assembly of the electrical machine. The vent portions are disposable within stator vents of the stator assembly. The slot portions absorb heat from the stator coils of the stator assembly and transfer the absorbed heat to the vent portions. The vent portions reject the transferred heat into a cooling air flowing through the respective stator vent, thereby rapidly transferring heat from the respective stator coil to the cooling air flowing through stator vent, and thereby greatly increasing the power density of the electrical machine.

18 Claims, 12 Drawing Sheets

(56) References Cited

U.S. PATENT DOCUMENTS

| | | | |
|---|---|---|---|
| 2004/0155539 A1* | 8/2004 | Potoradi | H02K 9/20 310/58 |
| 2006/0038450 A1* | 2/2006 | Matin | H02K 9/20 310/58 |
| 2010/0026109 A1* | 2/2010 | Hassett | F28D 15/0275 310/54 |
| 2010/0026145 A1* | 2/2010 | Iwai | H02K 9/18 310/60 A |
| 2012/0256502 A1* | 10/2012 | Le Besnerais | H02K 9/02 310/54 |

* cited by examiner

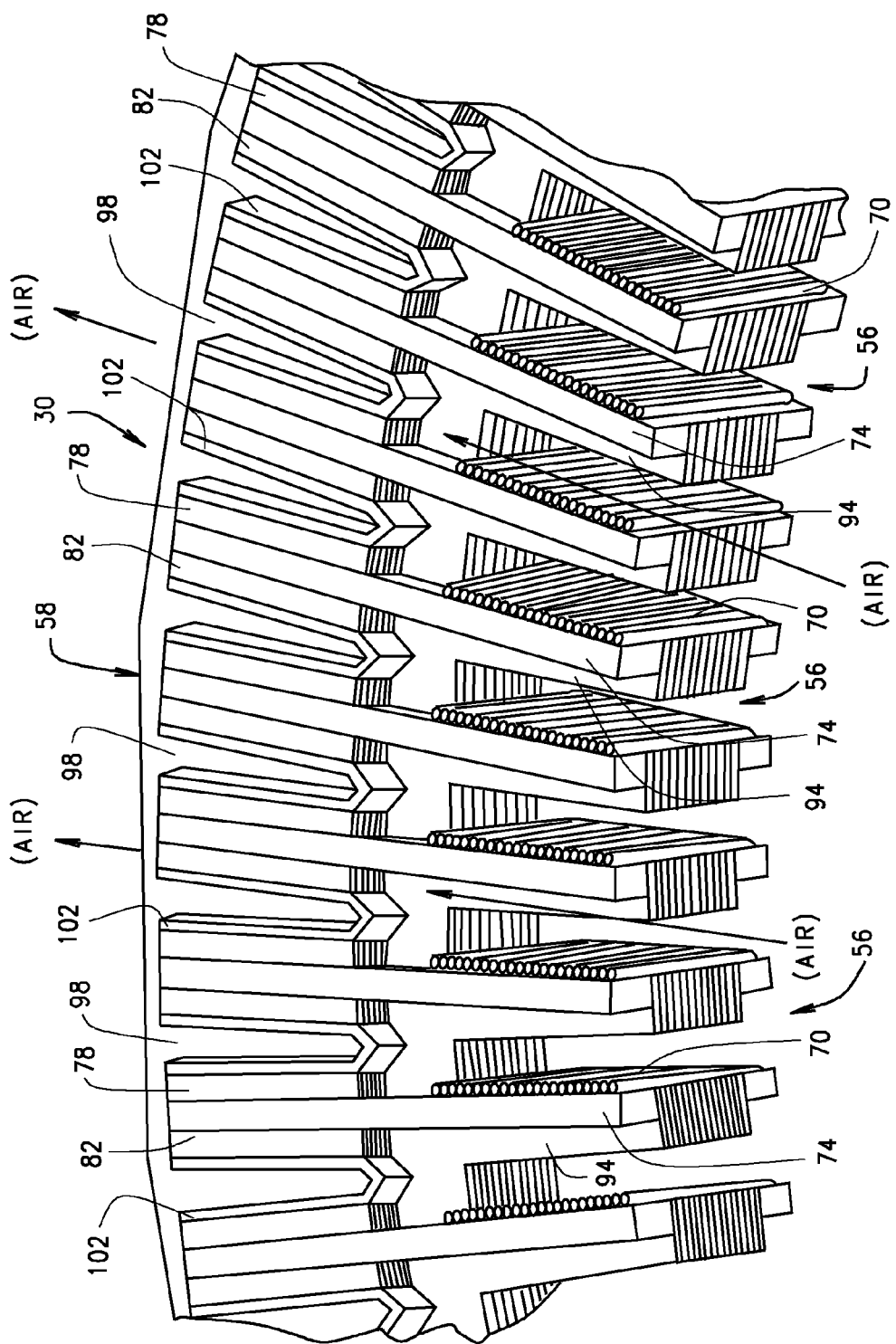

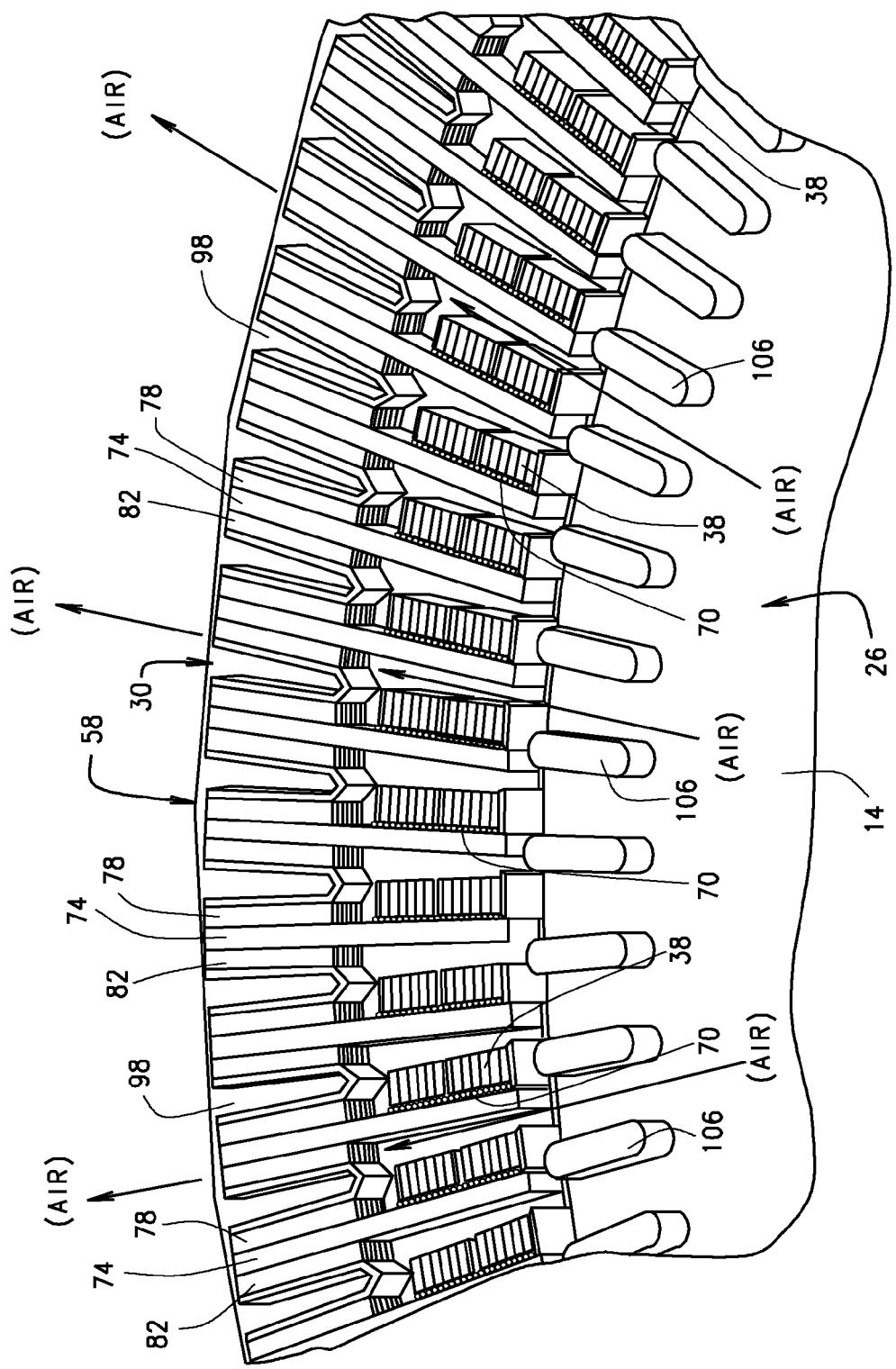

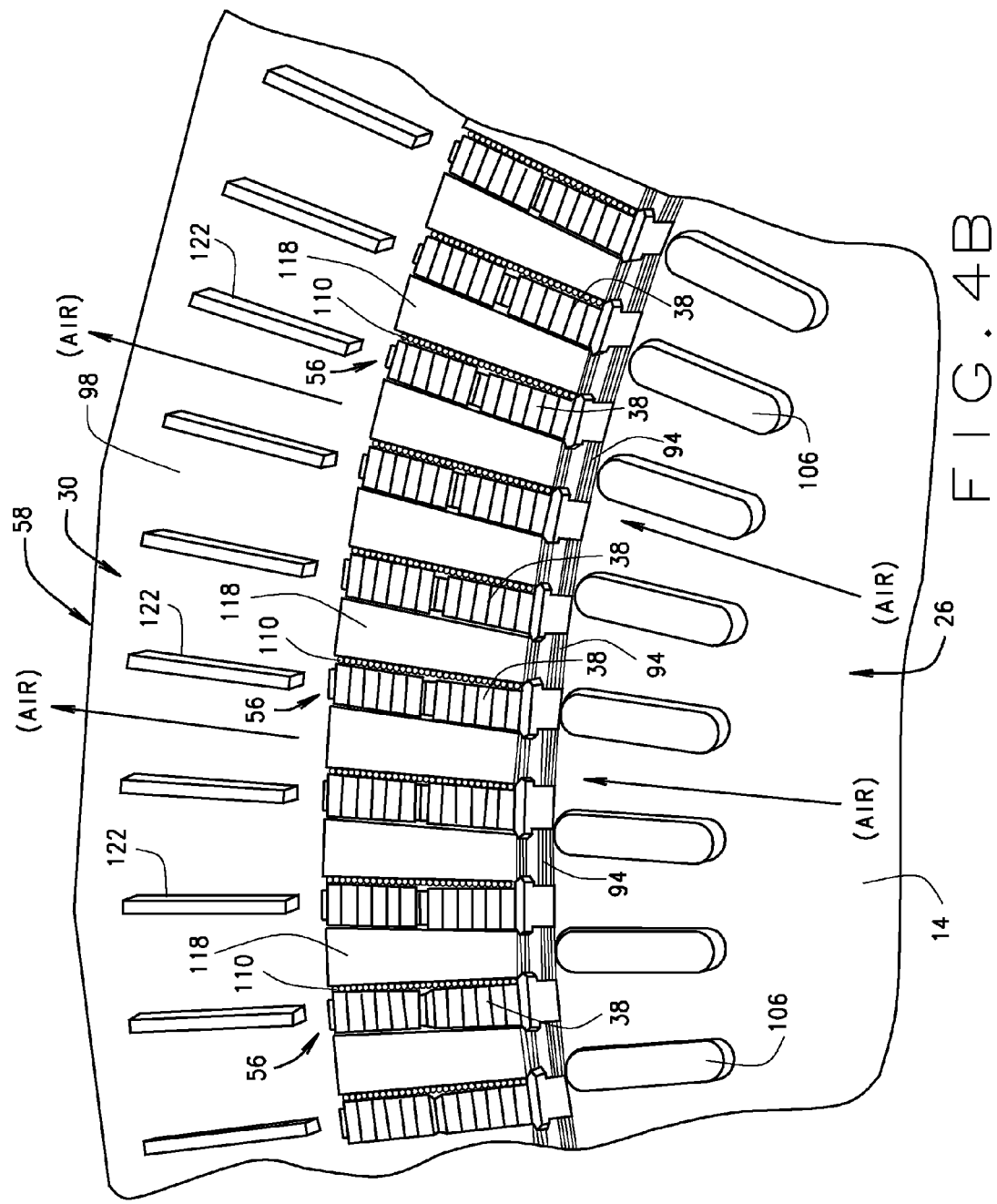

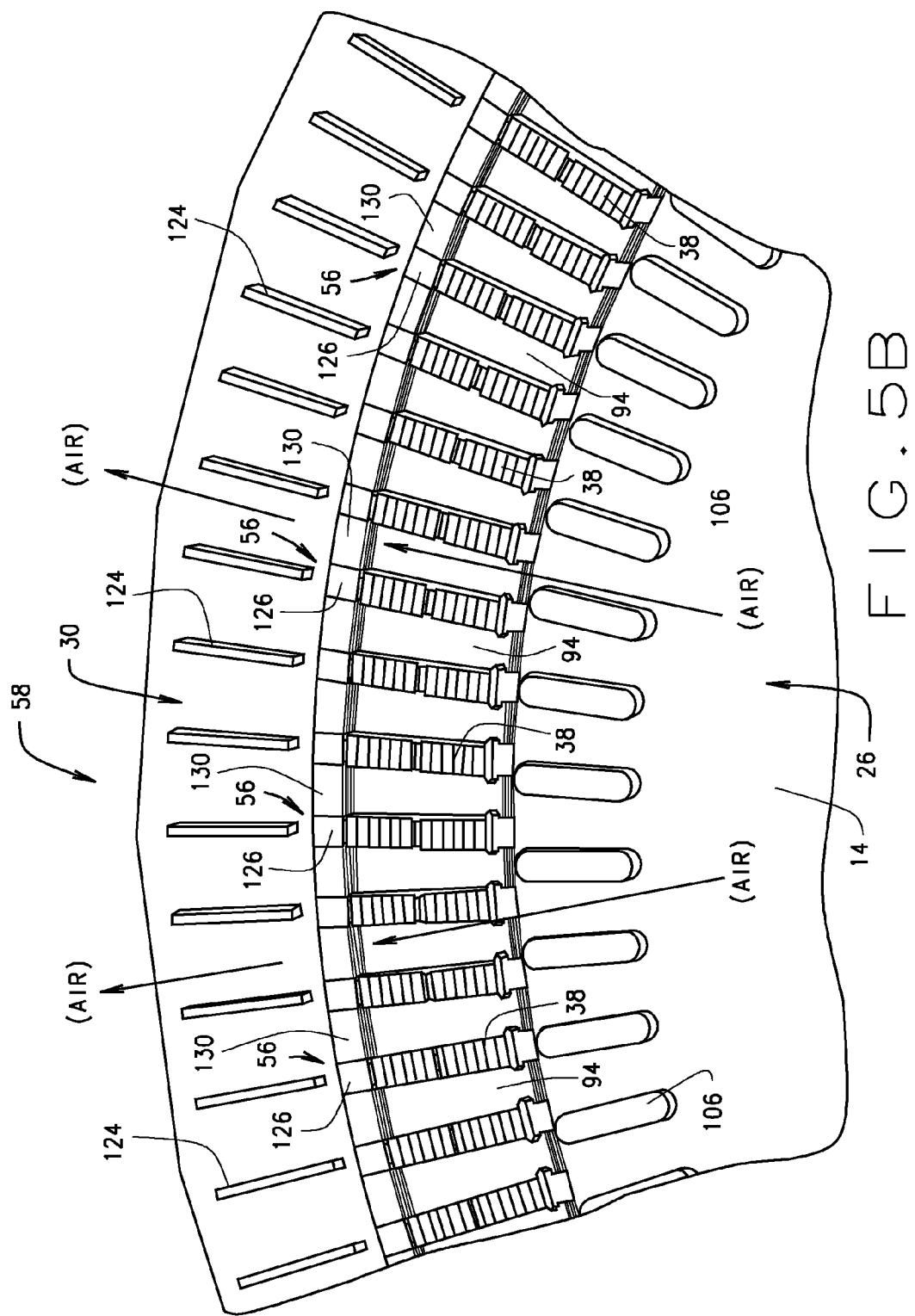

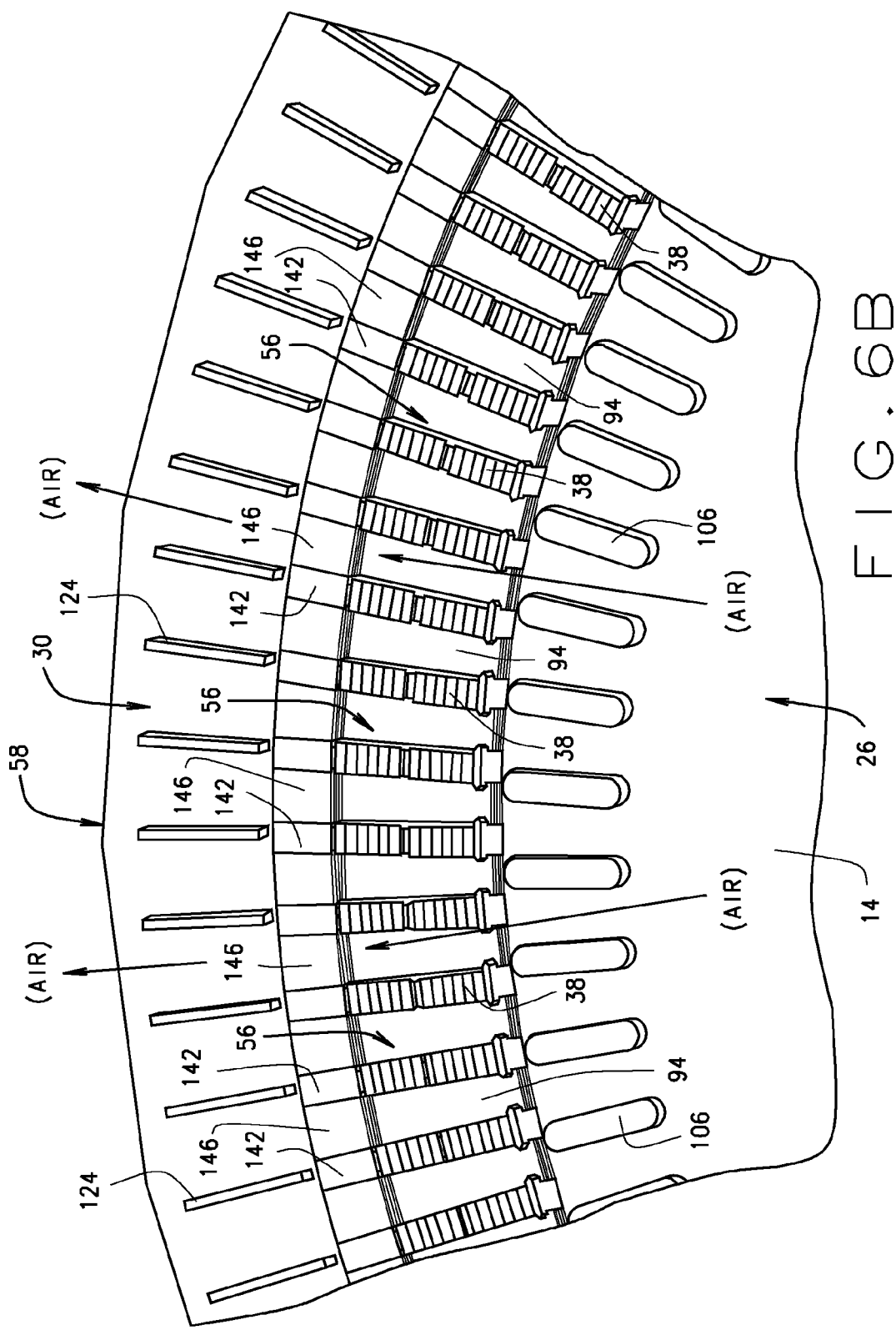

RADIAL VENT COMPOSITE HEAT PIPE

CROSS-REFERENCE TO RELATED APPLICATIONS

This application claims the benefit of U.S. Provisional Application No. 61/768,680, filed on Feb. 25, 2013. The disclosure of the above application is incorporated herein by reference in its entirety.

The present application is related in general subject matter to U.S. Pat. No. 7,569,955, issued Aug. 4, 2009, titled ELECTRIC MOTOR WITH HEAT PIPES, and to U.S. patent application Ser. No. 12/352,301, filed Jan. 12, 2009, titled COMPOSITE HEAT PIPE STRUCTURE, each of which is hereby incorporated by reference, in its entirety, into the present application.

FIELD

The present teachings relate to electrical machines, e.g., motors, generators, transformers, synchronous condensors having increased power density utilizing novel heat pipe technology, disclosed herein, to cool the such electrical machines.

BACKGROUND

The statements in this section merely provide background information related to the present disclosure and may not constitute prior art.

Typically, large motors, generators and transformers (i.e. large electric machines) remove internal heat in the following fashion. Air is ingested at one or both ends of the rotor. The air can be ingested solely by the suction created by the pumping action of the rotor or assisted by external blowers. Part of the ingested cooling air blows directly over the stator coil end turns. It should be noted that some electric machines have the air that has passed through the rotor and stator and is slightly heated blow over the exposed coil end turns before exiting (as is the case with single end ventilated machines).

The ingested air travels axially down the rotor in the space between the shaft spider bars and is pumped through the rotor radial vents by the rotor bars. The air is then pumped through the air gap (the radial space between the stator and the rotor) and into the stator radial air vents. The air enters the stator radial air vent and blows over the exposed coil end head (i.e. the coil section in the vent section and not the core section where the coil is surrounded by the stator core iron). The air then blows through the rest of the radial vent until it is exhausted at the outside diameter of the stator core. The radial vent sections alternate with the core pack sections. A typical core section is 1.75" long and a typical radial vent sections is 0.5" wide. However, the sizes and proportions of the core packs and air vent sections vary significantly from one design to the next. In addition, some designs have the stator and rotor vent packs aligned with each other, while in other designs they are offset.

The above description does not include the airflow through the frame, bearing brackets, air enclosures, etc., as these details are machine specific and commonly known to one skilled in the art.

The power density of such electric machines is thermally limited by the stator coil temperature. In particular, the stator coil temperature is limited by the maximum allowable temperature of the electrical insulation system (i.e. the insulation that surrounds the coil). It should also be noted that approximately 50% of the total motor losses (which manifest themselves as heat) are generated within the stator coils. The heat that is generated within the coil has three parallel paths by which it can be shed: 1) convection in the small section of exposed coil (i.e. the part of the coil that is in the vent packet area) directly cooled by the air flow; 2) conduction in the larger section of stator coil that is surrounded by the stator core iron (i.e. the part of the coil that is in the core packet section). This area is cooled by conducting heat from the coil to the core iron, and the again by conduction as the heat travels axially in the core pack section until it gets to the outermost lamination in the core pack area. This outermost stator iron lamination has the heat is removed via convection by the cooling air as it travels in the radial air vent; and 3) convection in the exposed coil end turns directly cooled by the air flow.

The stator coil temperature is a balance of how much heat is generated in the coil and how effectively this heat is rejected through the three parallel paths as described above. This maximum coil temperature limits the maximum power that a particular machine can produce.

As described above, approximately half of the heat is generated in the coil. A large proportion of the coil is surrounded by the core iron, and thus not effectively cooled. For instance, if the air vent is 0.5" wide and the stator core pack length is 1.75", then only 22% of the coil length is directly exposed to the cooling air. The thermal resistance is very high between the coil in the core pack area and the face of the radial vent (this is also the outermost lamination of the core pack) where it is convected to the air stream. This high thermal resistance path is the only heat transfer path for the larger stator coil area where most of the heat generated in the coil is generated. Details for this long, torturous heat transfer path resulting in the high thermal resistance is as follows.

Within a specific core pack section, heat is conducted through the center portion of the stator coil to the outer edges of the coil. This heat is then conducted from the outer surface of the stator coil through the electrical insulation. The coil insulation has a high thermal resistance, but it is very thin (typically 0.030" per side for medium voltage (4000 Volt) electric machine, but the actual thickness varies significantly from one design to the next). The heat is then conducted from the insulation to the stator slot edges in the stator core. The edges are formed from the individual laminations. All the laminations in the core pack are make up a core pack area.

Heat is conducted radially and axially in the stator core from the slot area to the surface of the radial air vent. The stator core is not a solid block of steel, but consists of many very thin steel plates (i.e. the stator laminations). These laminations have insulation on the surfaces which further raises the thermal resistance and inhibits heat transfer in the axial direction.

Typical stator laminations are 0.018" thick. Lamination thickness varies significantly from design to the next. This example of an electrical machine with a 1.75" core packet length would consist of 95 individual laminations. The net impact of high thermal resistance is that it takes a greater temperature differential to move a given amount of heat. Conversely, the amount of heat that is transferred is limited by the temperature rise between the where the heat is generated (the stator coil) and where it is rejected (the air flowing through the radial air vent). Electrical machines are designed to balance the amount of heat that can be removed while staying below the maximum temperature limit at the coil. Very often, temperature sensing devices (such as resistance temperature devices (RTDs)) are placed directly in the stator slot to measure the temperature in the coil at the slot to assure that the maximum temperature limit is not exceeded. The stator coil is shown in FIG. 4.

Finally, the heat is convected to the air flowing through the radial air vents. There are two paths where the flowing air absorbs the heat: the air flowing directly over the short exposed section of stator coil and the air which is flowing through the rest of the air vent absorbing the heat that has been conducted through the stator core.

SUMMARY

The radial vent composite heat pipe system, described below and exemplarily illustrated throughout the various figures, improves the heat transfer capability of electric machines, e.g., motors, generators, transformers. In so doing, this system increases the power density potential of these electrical machines. Thus, the same size machine will be capable of greater power generation or transformation.

In various embodiments, the present disclosure provides a radial vent composite heat pipe system for cooling and increasing the power density of an electrical machine. Generally, the system comprises a plurality of radial vent composite heat pipe assemblies, wherein each heat pipe assembly comprises a slot portion thermally connected to a vent portion. The slot portion of each heat pipe assembly is disposable within a respective one of a plurality of stator slots of a stator core pack of a stator assembly of the electrical machine. The vent portion is disposable within a respective one of a plurality of stator vents of the stator assembly. The slot portion of each heat pipe assembly is structured and operable to absorb heat from a respective one of a plurality of stator coils of the stator assembly and transfer the absorbed heat to the vent portion. The vent portion of each heat pipe assembly is structured and operable to reject the transferred heat from the slot portion of the respective heat pipe assembly into a cooling air flowing through the respective stator vent, thereby rapidly transferring heat from the respective stator coil to the cooling air flowing through stator vent, and thereby greatly increasing the power density of the electrical machine.

This disclosure describes and illustrates the radial vent composite heat pipe system and methods for integrating the radial vent composite heat pipe system with an induction electric rotating machine. However, it should be understood that the radial vent composite heat pipe system and methods for integration are equally applicable to other machine topologies and transformers.

DRAWINGS

The drawings described herein are for illustration purposes only and are not intended to limit the scope of the present teachings in any way.

Figure 1A:
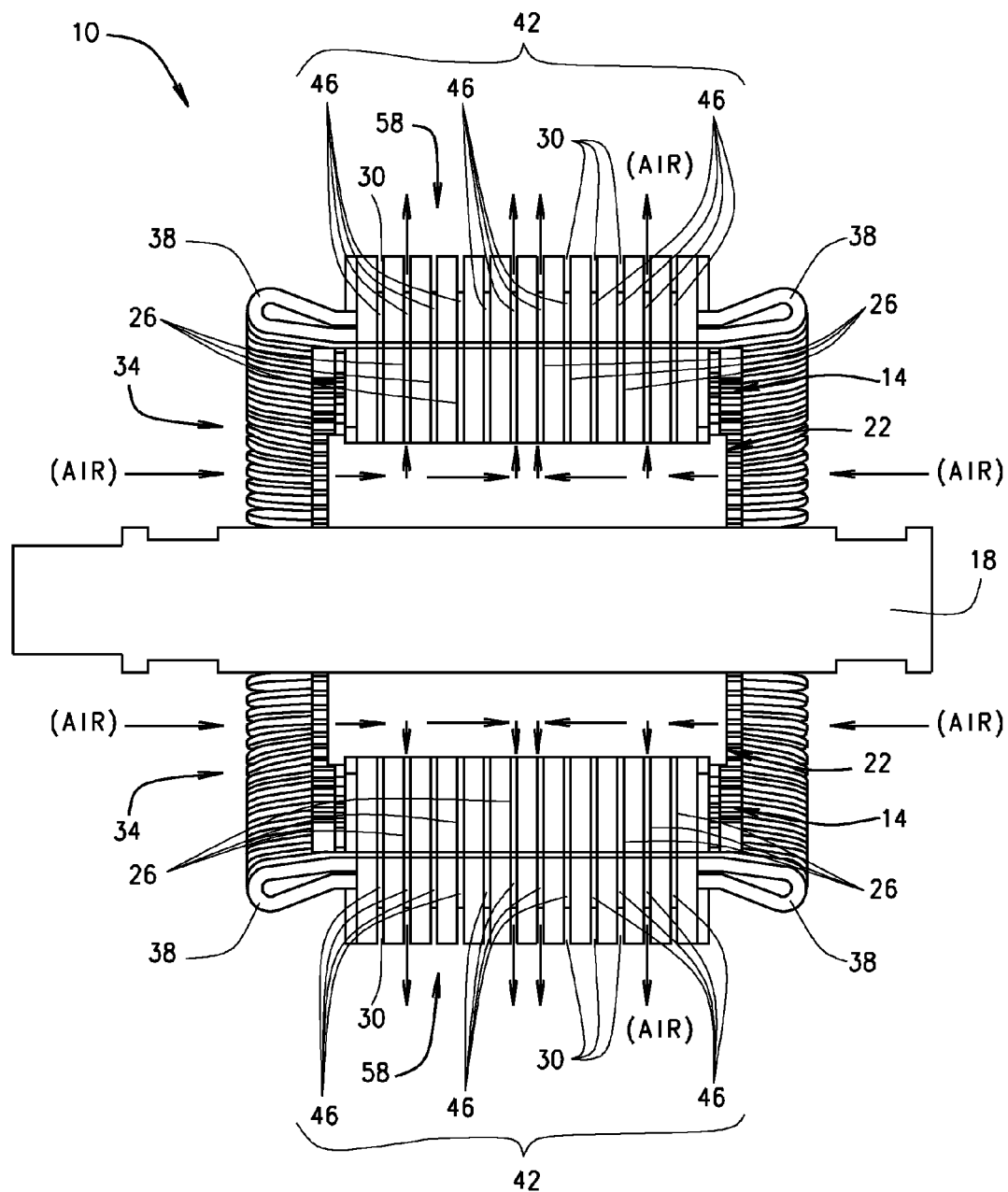
FIG. 1A is cross-sectional view of an electric machine, absent a frame and/or housing, with double end ventilation including a radial vent composite heat pipe system, in accordance with various embodiments of the present disclosure.
Figure 1B:
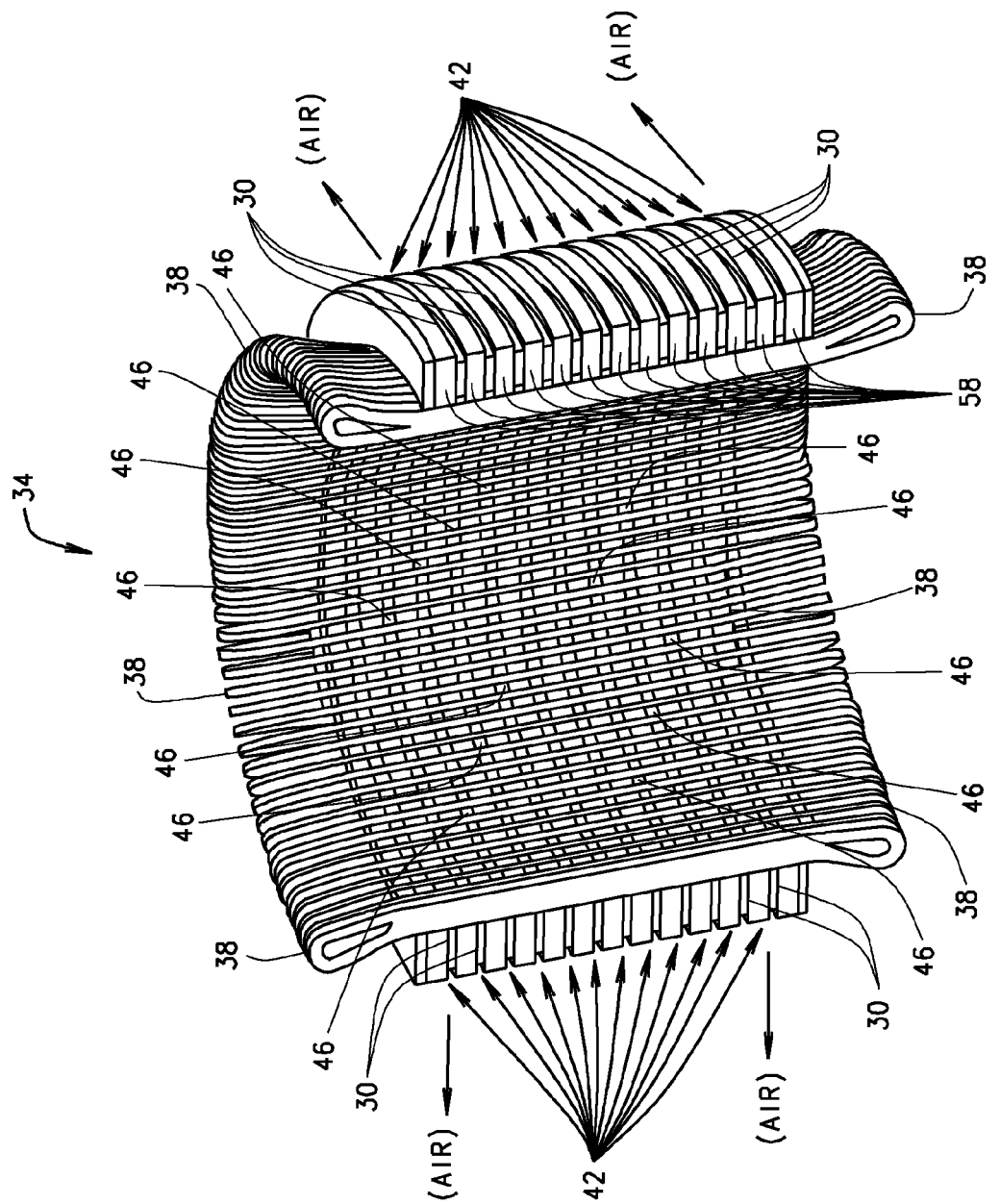
FIG. 1B is an isometric cross-sectional view of the a stator assembly of the electric machine shown in FIG. 1 including the radial vent composite heat pipe system, in accordance with various embodiments of the present disclosure.
Figure 2A:
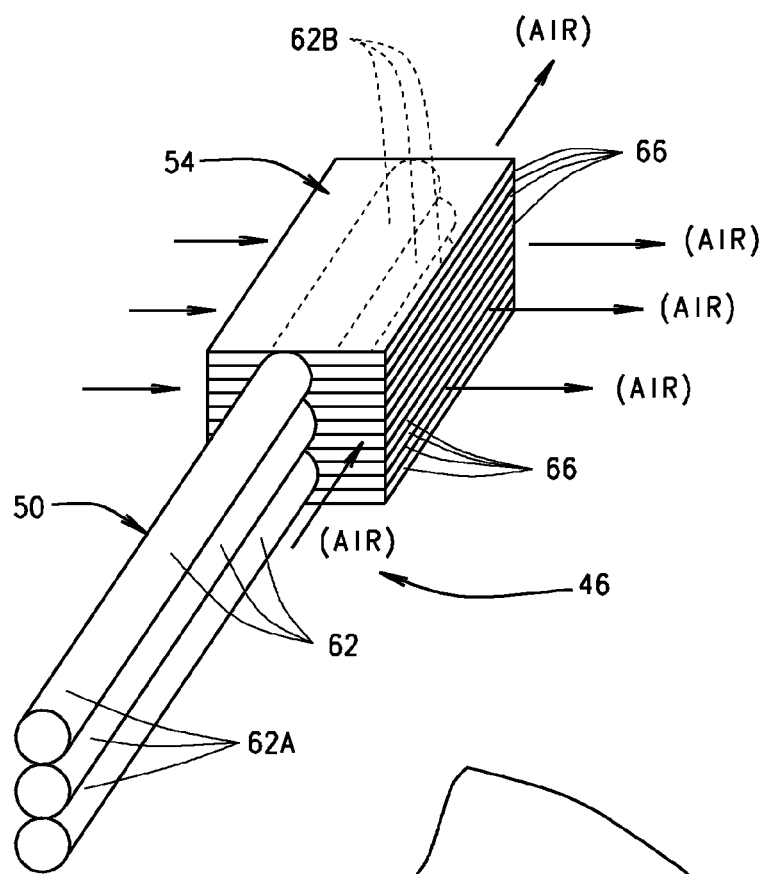
FIG. 2A is an isometric view of an exemplary generic radial vent composite heat pipe assembly of the radial vent composite heat pipe system shown in FIGS. 1A and 1B, in accordance with various embodiments of the present disclosure.
Figure 2B:
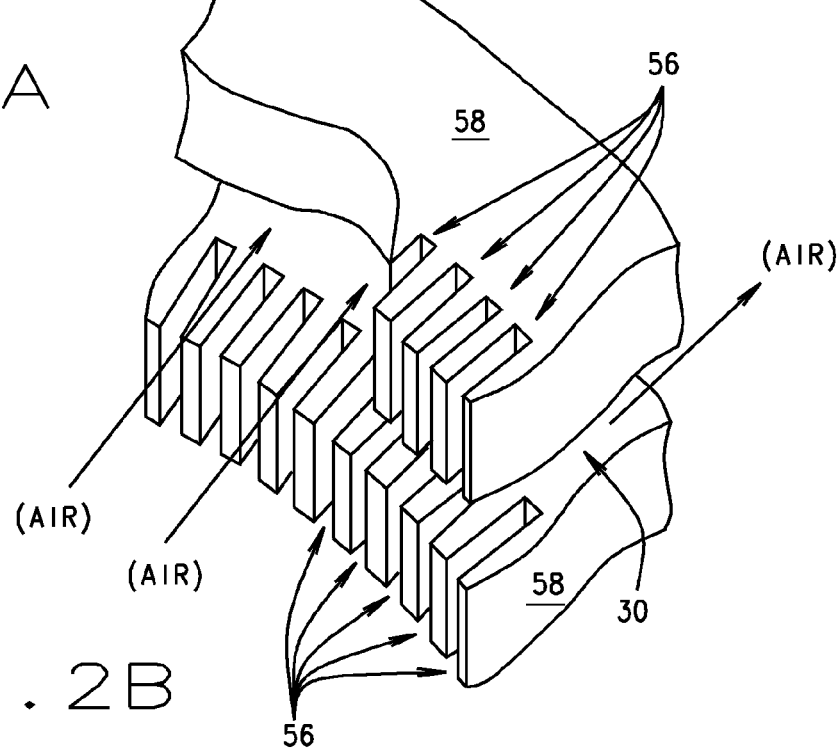

FIG. 2B is an isometric view of a portion of the stator assembly shown in FIG. 1B, absent the windings and the radial vent composite heat pipe system, illustrating the stator slots in which the radial vent composite heat pipe assemblies, generically shown in FIGS. 2A and exemplarily shown in FIGS. 3A, 4A, 5A and 6A in accordance various embodiments, are disposed and illustrating one of a plurality of radial stator vents of the stator assembly shown in FIG. 1B through which cooling air flows to remove heat from a condenser end and vent portion of each radial vent composite heat pipe assembly of the radial vent composite heat pipe system, in accordance with various embodiments of the present disclosure.

Figure 3A:
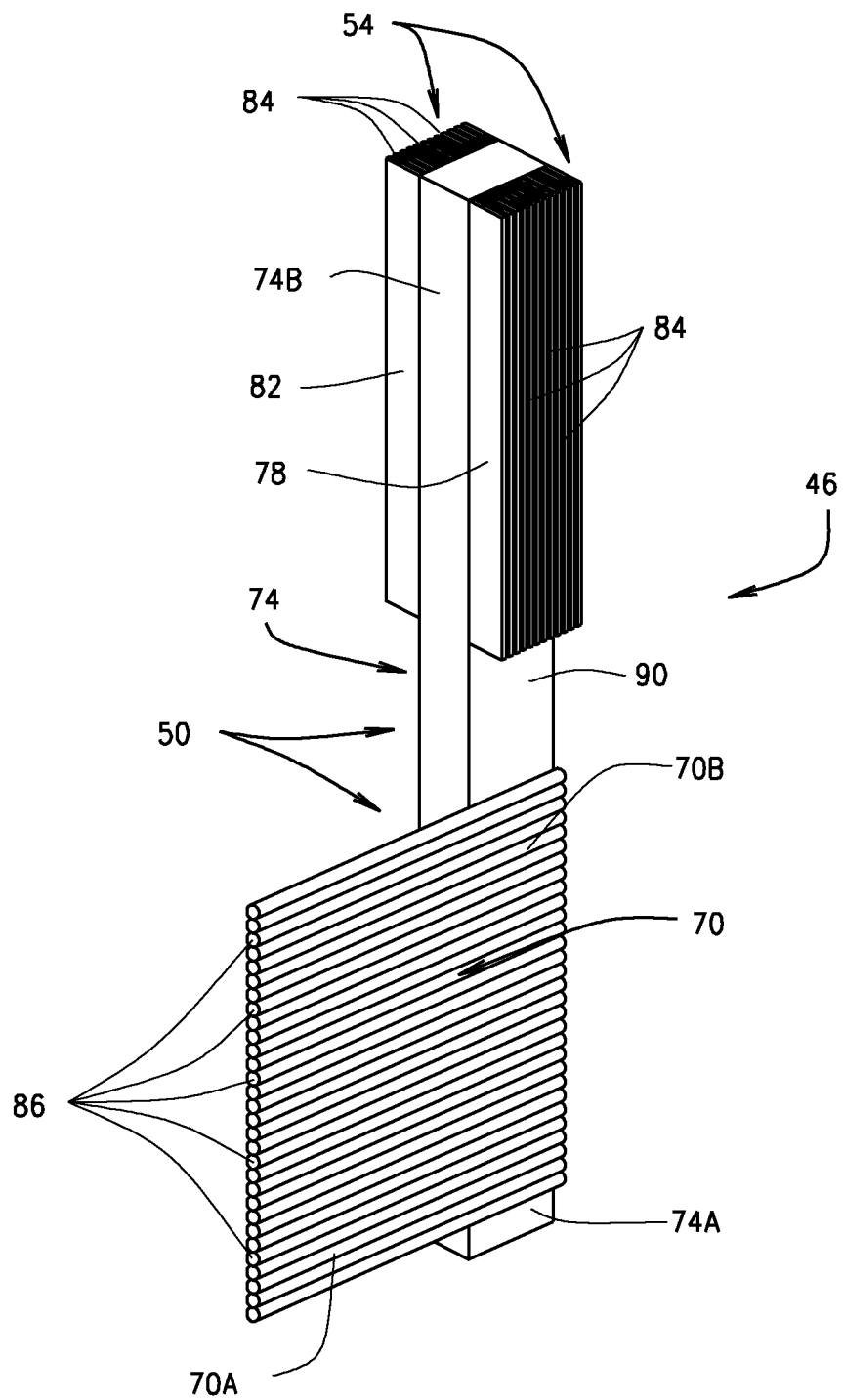

FIG. 3A is an isometric view of the radial vent composite heat pipe assembly shown in FIG. 2A, in accordance with various embodiments of the present disclosure.

FIG. 3B is an isometric view of a portion of the stator assembly shown in FIG. 1B, absent the windings, having the embodiment of the radial vent composite heat pipe assembly shown in FIG. 3A disposed within the stator slots.

FIG. 3C is an isometric view of the a portion of the stator assembly shown in FIG. 3B, having the embodiment of the radial vent composite heat pipe assembly shown in FIG. 3A and the windings disposed within the stator slots.

Figure 4A:
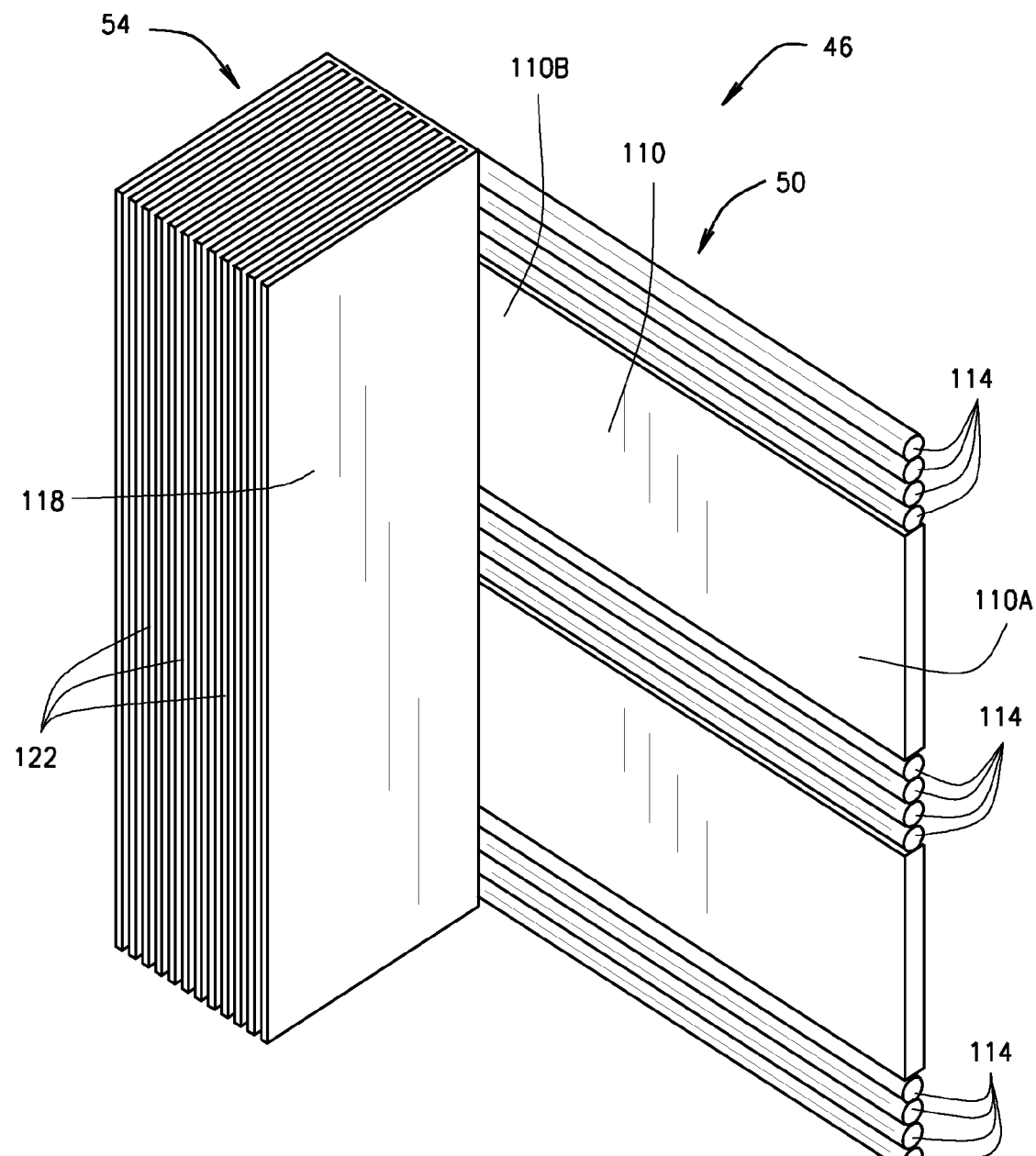

FIG. 4A is an isometric view of the radial vent composite heat pipe assembly shown in FIG. 2A, in accordance with various other embodiments of the present disclosure.

FIG. 4B is an isometric view of a portion of the stator assembly shown in FIG. 1B, including the stator windings, having the embodiment of the radial vent composite heat pipe assembly shown in FIG. 4A disposed within the stator slots.

Figure 5A:
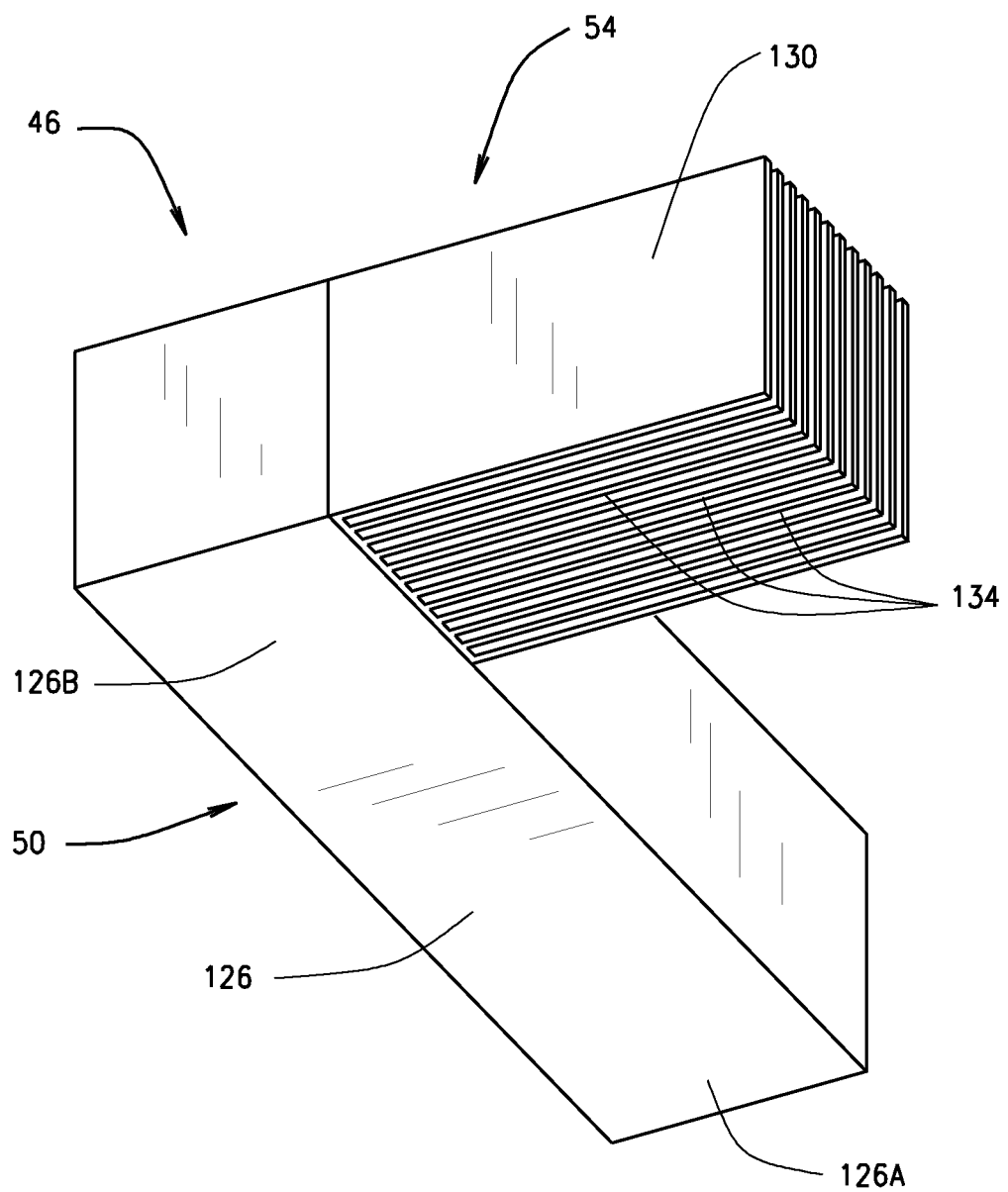

FIG. 5A is an isometric view of the radial vent composite heat pipe assembly shown in FIG. 2A, in accordance with yet various other embodiments of the present disclosure.

FIG. 5B is an isometric view of a portion of the stator assembly shown in FIG. 1B, including the stator windings, having the embodiment of the radial vent composite heat pipe assembly shown in FIG. 5A disposed within the stator slots.

Figure 6A:
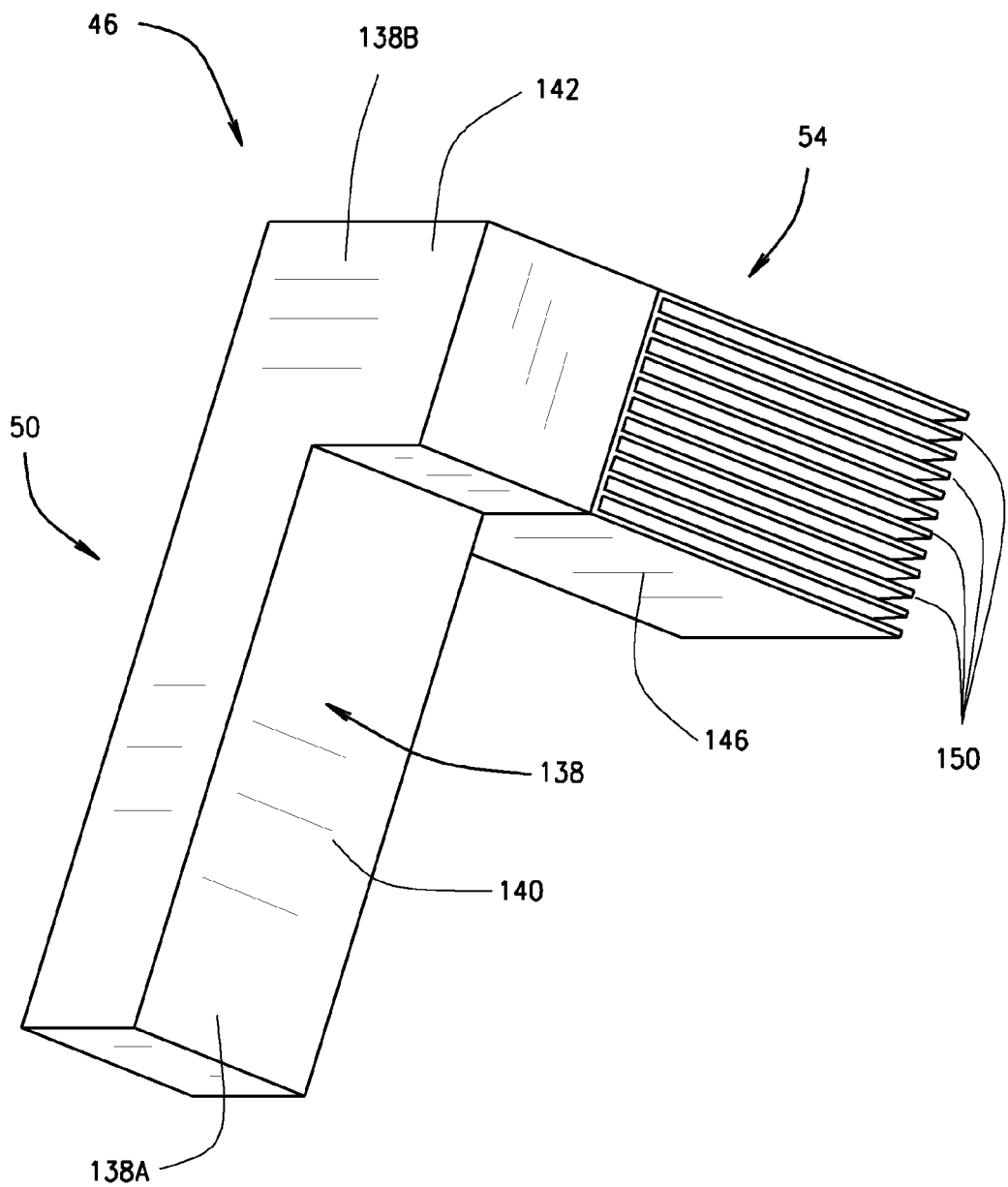

FIG. 6A is an isometric view of the radial vent composite heat pipe assembly shown in FIG. 2A, in accordance with still yet various other embodiments of the present disclosure.

FIG. 6B is an isometric view of a portion of the stator assembly shown in FIG. 1B, including the stator windings, having the embodiment of the radial vent composite heat pipe assembly shown in FIG. 6A disposed within the stator slots.

Corresponding reference numerals indicate corresponding parts throughout the several views of drawings.

DETAILED DESCRIPTION

The invention is based on heat pipe technology. Heat pipe technology is well known and will not be explained in this disclosure. Further areas of applicability of the present teachings will become apparent from the description provided herein. The following description is merely exemplary in nature and is in no way intended to limit the present teachings, application, or uses. Throughout this specification, like reference numerals will be used to refer to like elements.

Referring to FIGS. 1A and 1B, as described above, large electric machines, such as the electric machine 10 (shown without a frame or housing), remove internal heat by ingesting cooling air into the machine at one or both ends of a rotor as the rotor rotates during operation of the machine. Particularly, as exemplarily illustrated in FIG. 1A, cooling air (shown as arrows) is drawn into or ingested into the machine 10 at both ends of a rotor 14 (i.e. double end ventilated) that is connected to a machine shaft 18 via a plurality of shaft spider bars 22. Due to the rotation of the rotor 14, the cooling air is then drawn into radial rotor vents 26 and subsequently blown or pushed radially outward into radial stator vents 30 of the machine stator assembly 34 and across the portions of the machine coils 38 extending through the stator vents 30. Generally, the cooling air blown through the stator vents 30 and across the coils, i.e., the coil end turns, 38 removes heat from the coils 38 and exhausts the removed heat (i.e., heated air) out the distal ends of the stator vents 30 to an exterior of the machine 10.

Referring now to FIGS. 1A, 1B, 2A and 2B, in order to expedite and increase the removal of the heat from the coils 38, and thereby increase the power density of the machine 10, the machine 10 of the present disclosure includes a radial vent composite heat pipe system 42 that comprises a plurality of radial vent composite heat pipe assemblies 46 having at least a portion thereof disposed within the stator vents 30. More particularly, as describe further below and exemplarily illustrated in FIG. 2A, each composite heat pipe assembly 46 of the heat pipe system 42 comprises a slot portion 50 and a vent portion 54. The slot portion 50 of each composite heat pipe assembly 46 is disposed within a respective one of a plurality of stator slots 56 (the stator slots 56 are best shown in FIG. 2B) and in contact with a portion of a respective coil 38 disposed within the respective stator slot 56 (as best shown in FIG. 1B), while the vent portion 54 is disposed with a respective stator vent 30 defined between adjacent stator core packs 58.

Generally, the stator assembly 34 comprises a plurality of laminated stator core packs 58 that each includes a plurality of the stator slots 56, and a plurality of the coils 38 disposed within the stator slots 56. More specifically, the plurality of stator core packs 58 are joined together, but spaced apart such that the spaces between adjacent stator core packs 58 provide the stator vents 30. Moreover, the stator core packs are joined together such that the stator slots 56 of each stator core pack 58 are aligned with the stator slots 56 of each adjacent stator core pack 58, whereby the coils 38 can be longitudinally disposed within the adjacent stator slots 56, as illustrated in FIG. 1B.

Importantly, the heat pipe system 42 comprises a plurality of the composite heat pipe assemblies 46 that are disposable within a plurality, or all, of the stator slots 56 in a plurality, or all, of the laminated stator packs 58. Particularly, the heat pipe system 42 can be disposed within the stator assembly 34 such that a plurality, or all, of the stators slots 56 of a plurality, or all, of the stator core packs 58 have the slot portion 50 of a respective composite heat pipe assembly 46 disposed therein with the vent portion 54 of each composite heat pipe 46 disposed within the respective stator vent 30. The heat pipe system 42 is structured and operable to maximize the heat removed from the stator coils 38 and/or stator slots 30 with a minimal increase in temperature.

Referring now to FIGS. 2A and 2B, as briefly described above, each radial vent composite heat pipe assembly 46 of the radial vent composite heat pipe system 42 comprises a slot portion 50 thermally connected to the vent portion 54. The slot portion 50 of each composite heat pipe assembly 46 comprises one or more heat pipes 62, each having an evaporator, or heat absorption, end 62A and a condenser, or heat rejection, end 62B. In various embodiments, the slot portion 50 can further include an outer body (not shown in FIG. 2A) having the one or more heat pipes 62 disposed internally therein.

As is known, heat pipes, e.g., heat pipes 62, are a heat transfer mechanism that can transport large quantities of heat with a very small difference in temperature between a hot interface, e.g., the stator slots 56 and coils 38 of the stator assembly 34, and a cold/cool interface, e.g., the cooling air flowing through the radial stator vents 30. Specifically, heat is transferred from the evaporator end, e.g., evaporator end 62A, of the heat pipe to the opposing condenser end, e.g., condenser end 62B, of the heat pipe by a rapid transition of a heat vaporized working fluid, disposed within the heat pipe from the evaporator end to the condenser end.

More particularly, with regard to the heat pipe system 42 of the present disclosure, the slot portion 50 of each heat pipe assembly 46 is disposed within a respective stator slot 56 such that the evaporator end 62A of each heat pipe 62 (or, in various embodiments, the evaporator end portion of the outer body) is in thermal contact with the respective stator coil 38 and/or a wall of the respective stator slot 56 (hereafter simply referred to as being in contact with the respective stator slot 56) and the condenser end 62B of each heat pipe 62, including the vent portion 54 (as described further below) extends into the respective stator vent 30 and will be in thermal contact with the cooling air flow during operation of the electric machine 10. As used herein, thermal contact will be understood to mean direct and/or indirect contact such that heat can be rapidly absorbed or rejected between the respective surfaces or components.

Absorption of heat from the respective stator coil and/or slot 38/56 at the evaporator end 62A will heat the evaporator end 62A and cause the working fluid at the evaporator end 62A to turn to vapor, thereby increasing the vapor pressure inside the heat pipe 62. Latent heat of evaporation absorbed by the vaporization of the working fluid removes heat from the respective stator coil and/or slot 38/56. Subsequently, the vapor pressure at the evaporator end 62A drives a rapid mass transfer of the heated vaporized working fluid from the evaporator end 62A to the condenser end 62B where the vapor condenses and releases its latent heat, via the vent portion 54, to the cooling air flowing through the respective radial stator vent 30, thereby rapidly transferring heat from the respective stator coil and/or slot 38/56 to the cooling air flowing through the stator vent 30. Thereafter, the condensed working fluid flows back to the evaporator end of the heat pipe and the cycle is repeated.

Moreover, the vent portion 54 of each heat pipe assembly 46 is thermally connected to the condenser end of the respective heat pipe(s) 62 of the heat pipe assembly slot portion 50. The vent portion 54 of each heat pipe assembly 46 is structured and operable to increase the removal of heat from the respective condenser end(s) 62B of the respective heat pipe(s) 62, thereby increasing the transfer of heat from the respective evaporator end(s) 62B, and thereby increasing the removal of heat from the respective stator coil and/or slot 38/56. Importantly, upon disposition of the slot portion 50 into the respective stator slot 56, each vent portion 54 is disposed within the respective stator vent 30 such that it is directly in the path of the cooling air blown through the respective stator vent 30.

In various embodiments, the vent portion 54 of each heat pipe assembly comprises a plurality of cooling fins 66 that are brazed (or otherwise attached with good thermal contact) to the condenser end(s) 62B of the respective heat pipe(s) 62 (or to the outer body in embodiments wherein the slot portion 50 includes an outer body). The cooling fins 66 are spaced apart to allow the cooling air to flow between the fins 66, there providing more surface area for the cooling to air to contact the fines 66 and remove heat more rapidly and efficiently.

As briefly described above, during assembly of the stator assembly 34, the slot portion 50 of each composite heat pipe assembly 46 of the heat pipe system 42 is disposed within a respective stator slot 56 such that, once the respective coil 38 is disposed within the respective stator slot 56, the slot portion 50 is in thermal contact with the respective stator coil and/or slot 38/56. Furthermore, each composite heat pipe assembly 46 is disposed within a respective stator core pack 58 so that the respective vent portion 54 is disposed within the respective stator vent 30 and directly in the path of the cooling air. Importantly, the vent portion 54 of each composite heat pipe assembly 46 is disposed within the respective stator vent 30 such that the cooling air will pass through the spaces between and across broad surfaces/faces of the cooling fins 66.

Therefore, during operation of the electric machine 10 the cooling air blown through the stator vents 30 with pass through and over the cooling fins 66 of each composite heat pipe assembly 46 of the entire composite heat pipe system 42. Consequently, heat will be rapidly and efficiently removed from the vent portions 54, particularly from the heat pipe condenser ends 62B, of each composite heat pipe assembly 46 in the entire composite heat pipe system 42, thereby rapidly and efficiently removing heat from the heat pipe evaporator ends 62A of each composite heat pipe assembly 46 in the entire composite heat pipe system 42, thereby rapidly and efficiently removing heat from the stator coils and/or slots 38/56 of the entire stator assembly 34.

Accordingly, via the radial vent composite heat pipe system 42 described herein, heat can be more rapidly and efficiently removed from the stator coils and/or stator slots of an electrical machine (such as the electrical machine 10) than known systems and methods, thereby greatly increasing the power density of such electrical machines.

Referring now to 3A, 3B and 3C, in various embodiments, each radial vent composite heat pipe assembly 46 (generically described with regard to FIGS. 1A, 1B, 2A and 2B) can comprise a two-part slot portion 50 and a two-part vent portion 54. In such embodiments, the slot portion 50 of each composite heat pipe assembly 46 comprises a first heat pipe section 70 thermally connected to a second heat pipe section 74 that collectively form the heat pipe(s) 62 of the generic embodiment shown in FIG. 2A. Additionally, the vent portion 54 comprises a first cooling fin array 78 and a second cooling fin array 82, each including a plurality of cooling fins 84 that collectively form the cooling fins 66 of the generic embodiment shown in FIG. 2A. Both the first and second cooling fin arrays 78 and 82 are thermally connected to a condenser end 74B of the second heat pipe section 74 (which forms the heat pipe condenser end(s) 62B of the generic embodiment shown in FIG. 2A).

The first heat pipe section 70 comprises a plurality of heat pipes 86 that are joined to form a panel of heat pipes 86. The evaporator ends of the heat pipes 86 cumulatively form an evaporator end 70A of the first heat pipe section 70 and the condenser ends of the heat pipes 86 cumulatively form a condenser end 70B of the first heat pipe section 70. The second heat pipe section 74 comprises one or more heat pipes 90 having evaporator end(s) that cumulatively form the evaporator end 74A of the second heat pipe section 74 and condenser end(s) that cumulatively form the condenser end 74B of the second heat pipe section 74. As illustrated in FIG. 3A the condenser end 70B of the first heat pipe section 70 is connected to the evaporator end 74A of the second heat pipe section 74. As further illustrated in FIG. 3A, the first and second cooling fin arrays 78 and 82 are brazed (or otherwise attached with good thermal contact) to the condenser end 74B of the second heat pipe section. As still further illustrated in FIG. 3A, the first heat pipe section 70 extends from the second heat pipe section 74 orthogonally from the direction in which the first and second cooling fin arrays 78 and 82 extend from the second heat pipe section 74.

In various embodiments, the heat pipes 86 of the first heat pipe section 70 can be enclosed within an outer body (not shown). Additionally, although the second heat pipe section 74 is exemplarily illustrated as having an elongated rectangular shape, it should be understood that the elongated rectangular second heat pipe section 74 shown can be illustrative of a single rectangular bar shaped heat pipe 90, or illustrative of a plurality of heat pipes 90 having a rectangular bar shape, a cylindrical shape or any other suitable shape, or illustrative of a plurality of heat pipes 90 enclosed within a rectangular bar shaped outer body.

As illustrated in FIGS. 3B and 3C, to implement the radial vent composite heat pipe system 42 comprising the embodiment of the composite heat pipe assembly 46 shown and described with regard to FIG. 3A, the evaporator end 70A of the first heat pipe section 70 of each composite heat pipe assembly 46 is disposed within and along a sidewall of a respective stator slot 56 such that one face of each first heat pipe section 70 is in thermal contact with the stator core iron and the opposing face is in thermal contact with the respective coil 38. The first heat pipe section 70 of each radial vent composite heat pipe assembly 46 is relatively thin. The specific thickness is dependent on the desired design and manufacturing details of electrical machine 10 and the respective radial vent composite heat pipe assemblies 46. As will be easily and readily understood by one skilled in the art, the coils 38 are disposed within the stator slots 56 after the composite heat pipe assemblies 46 are disposed within the stator slots 56 and stator vents 30 as described herein.

As the first heat pipe section 70 of each composite heat pipe assembly 46 is disposed within the respective stator slot 56, the second heat pipe section 74 is disposed along a top edge (with regard to the orientation of the stator core pack 58 shown in FIGS. 3B and 3C) of one of a plurality of stator core pack fingers 94 that define the stator slots 56 and extends along a top surface (with regard to the orientation of the stator core pack 58 shown in FIGS. 3B and 3C) of an annular body 98 the respective core pack 58 from which the core pack fingers 94 extend. Consequently, the first and second cooling fin arrays 78 and 82 are also disposed along a top surface (with regard to the orientation of the stator core pack 58 shown in FIGS. 3B and 3C) of an annular body 98 the respective core pack 58. Importantly, the second heat pipe section 74 and the first and second cooling fin arrays 78 and 82 of each composite heat pipe assembly 46 are disposed along the top surfaces (with regard to the orientation of the stator core pack 58 shown in FIGS. 3B and 3C) of the stator core pack fingers 94 and body 98 such that the second heat pipe section 74 and the first and second cooling fin arrays 78 and 82 are disposed within the respective radial stator vent 30 formed between the adjacent stator core packs 58. Moreover, the first and second cooling fin arrays 78 and 82 are disposed and oriented within the respective stator vent 30 such that the cooling air will flow between the respective cooling fins 84. Although FIG. 3B only exemplarily shows air flowing through two of the first and second cooling fin arrays 78 and 74, it should be understood that during operation of the electric machine 10 the cooling air will flow through the first and second cooling fin arrays 78 and 74 of every composite heat pipe assembly 46 of the composite heat pipe system 42 (shown in FIGS. 1A and 1B).

The above process is repeated for each core pack 58 of the stator assembly 34 (shown in FIG. 1B). In various embodiments, in order to retain each composite heat pipe assembly 46 in place, each composite heat pipe assembly 46 can be brazed, or affixed with good thermal contact in any other suitable manner, to respective stator core pack 58.

In various embodiments, the composite heat pipe system 42 can include a plurality of diverter spacers 102 disposed within the stator vents 30 between the first and second cooling fin arrays 78 and 82 of adjacent composite heat pipe assemblies 46. The diverter spacers 102 have a generally 'V' shape and are structured and operable to direct the cooling air flow into the respective first and second cooling fin arrays 78 and 82. In various implementations, the diverter spacers 102 can additionally be structured and operable to maintain a constant height of the respective stator vent 30, i.e., a constant space between adjacent core packs 58. To provide additional illustration of the cooling air flow, FIG. 3C shows a section of the rotor 14 and the respective rotor vent 26, and a plurality of rotor bars 106 disposed on the rotor 14.

In operation, heat is removed from each respective stator coil and/or slot 38/56 via the evaporator end 70A of the first heat pipe section 70 and transferred to the condenser end 70B of the first heat pipe section 70. Hence, the first heat pipe section 70 of each composite heat pipe assembly 46 directly absorbs the heat as it is generated in the respective coil 38. Subsequently, the heat is removed from the first heat pipe section condenser end 70B via the evaporator end 74A of the heat pipe second section 74. The heat removed from the first heat pipe section condenser end 70B is then transferred to the condenser end 74B of the second heat pipe section and removed therefrom via the cooling air flowing through the first and second cooling fin arrays 82.

Referring now to FIGS. 4A and 4B, in various embodiments, the slot portion 50 of each radial vent composite heat pipe assembly 46 (generically described with regard to FIGS. 1A, 1B, 2A and 2B), comprises a heat pipe panel 110 comprising a plurality of heat pipes 114. Additionally, in such embodiments, the vent portion 54 of each radial vent composite heat pipe assembly 46 (generically described with regard to FIGS. 1A, 1B, 2A and 2B) comprises a cooling fin array 118 including a plurality of cooling fins 122 that are brazed (or otherwise attached with good thermal contact) to a condenser end 110B of the heat pipe panel 110 (which forms the heat pipe condenser end(s) 62B of the generic embodiment shown in FIG. 2A). Although, FIG. 4A exemplarily illustrates the heat pipe panel 110 comprising three groups of heat pipes 114 spaced apart and joined by a solid intermediate section, it is envisioned that the heat pipe panel 110 can be comprised of a plurality of heat pipes 114 consecutively joined together, as shown in FIG. 4B. Additionally, in various embodiments, the heat pipes 114 can be enclosed within an outer body (not shown).

As illustrated in FIG. 4B, to implement the radial vent composite heat pipe system 42 comprising the embodiment of the composite heat pipe assembly 46 shown and described with regard to FIG. 4A, an evaporator end 110A of the heat pipe panel 110 of each composite heat pipe assembly 46 is disposed within and along a side wall of a respective stator slot 56 such that one face of heat pipe panel 110 is in thermal contact with the stator core iron and the opposing face is in thermal contact with the respective coil 38. The heat pipe panel 110 of each radial vent composite heat pipe assembly 46 is relatively thin. The specific thickness is dependent on the desired design and manufacturing details of electrical machine 10 and the respective radial vent composite heat pipe assemblies 46. As will be easily and readily understood by one skilled in the art, the coils 38 are disposed within the stator slots 56 after the composite heat pipe assemblies 46 are disposed within the stator slots 56 and stator vents 30 as described herein.

As the heat pipe panel 110 of each composite heat pipe assembly 46 is disposed within the respective stator slot 56, the cooling fin array 118 is disposed along the top edge (with regard to the orientation of the stator core pack 58 shown in FIG. 4B) of one of the respective stator core pack fingers 94 that define the stator slots 56. Importantly, the cooling fin array 118 of each composite heat pipe assembly 46 is disposed within the respective radial stator vent 30 formed between the adjacent stator core packs 58. Moreover, the cooling fin array 118 is disposed and oriented within the respective stator vent 30 such that the cooling air will flow between the respective cooling fins 122. Although FIG. 4B only exemplarily shows air flowing through two of the cooling fin arrays 118, it should be understood that during operation of the electric machine 10 the cooling air will flow through the cooling fin arrays 118 of every composite heat pipe assembly 46 of the composite heat pipe system 42 (shown in FIGS. 1A and 1B).

The above process is repeated for each core pack 58 of the stator assembly 34 (shown in FIG. 1B). In various embodiments, in order to retain each composite heat pipe assembly 46 in place, each composite heat pipe assembly 46 can be brazed, or affixed with good thermal contact in any other suitable manner, to respective stator core pack 58.

In operation, heat is removed from each respective stator coil and/or slot 38/56 via the evaporator end 110A of the heat pipe panel 110 and transferred to the condenser end 110B of the heat pipe panel 110. More specifically, the heat pipe panel 110 of each composite heat pipe assembly 46 directly absorbs the heat as it is generated in the respective coil 38. Subsequently, the heat transferred to the heat pipe panel condenser end 110B is removed from the heat pipe panel condenser end 110B via the cooling air flowing through the fins 122 of cooling fin array 118.

In various embodiments, the composite heat pipe system 42 can include a plurality of spacers 124 disposed within the stator vents 30. The spacers 124 are structured and operable to maintain a constant height of the respective stator vent 30, i.e., a constant space between adjacent core packs 58. To provide additional illustration of the cooling air flow, FIG. 4B shows a section of the rotor 14 and the respective rotor vent 26, and a plurality of rotor bars 106 disposed on the rotor 14.

Referring now to FIGS. 5A and 5B, in various embodiments, the slot portion 50 of each radial vent composite heat pipe assembly 46 (generically described with regard to FIGS. 1A, 1B, 2A and 2B), comprises one or more heat pipes 126 having evaporator end(s) 126A and condenser end(s) 126B. Although the heat pipe(s) 126 is/are exemplarily illustrated in FIGS. 5A and 5B as having an elongated square bar shape, it should be noted that it is envisioned that the elongated square bar heat pipe(s) 126 shown in FIGS. 5A and 5B can be illustrative of a single square bar shaped heat pipe 126, or illustrative of a plurality of heat pipes 126 having a square bar shape, a cylindrical shape or any other suitable shape, or illustrative of a plurality of heat pipes 126 enclosed within a square bar shaped outer body. Additionally, in such embodiments, the vent portion 54 of each radial vent composite heat pipe assembly 46 (generically described with regard to FIGS. 1A, 1B, 2A and 2B) comprises a cooling fin array 130 including a plurality of cooling fins 134 that are brazed (or otherwise attached with good thermal contact) to the condenser end 126B of the heat pipe(s) 126 (which form(s) the heat pipe condenser end(s) 62B of the generic embodiment shown in FIG. 2A).

As illustrated in FIG. 5B, to implement the radial vent composite heat pipe system 42 comprising the embodiment of the composite heat pipe assembly 46 shown and described with regard to FIG. 5A, the evaporator end(s) 126A of the heat pipe(s) 126 is/are disposed within and along a sidewall and an end wall of a respective stator slot 56 such that at least one side of the heat pipe(s) 126 is/are in thermal contact with the stator core iron and at least one of the remaining side(s) is/are in thermal contact with the respective coil 38. As will be easily and readily understood by one skilled in the art, the coils 38 are disposed within the stator slots 56 after the composite heat pipe assemblies 46 are disposed within the stator slots 56 and stator vents 30 as described herein.

As the heat pipe(s) 126 of each composite heat pipe assembly 46 is/are disposed within the respective stator slot 56, the cooling fin array 130 is disposed along the top surface (with regard to the orientation of the stator core pack 58 shown in FIG. 5B) of the body 98 the respective stator core pack 58 longitudinally adjacent one of the respective stator core pack fingers 94. Importantly, the cooling fin array 130 of each composite heat pipe assembly 46 is disposed within the respective radial stator vent 30 formed between the adjacent stator core packs 58. Moreover, the cooling fin array 130 is disposed and oriented within the respective stator vent 30 such that the cooling air will flow between the respective cooling fins 134. Although FIG. 5B only exemplarily shows air flowing through two of the cooling fin arrays 130, it should be understood that during operation of the electric machine 10 the cooling air will flow through the cooling fin arrays 130 of every composite heat pipe assembly 46 of the composite heat pipe system 42 (shown in FIGS. 1A and 1B).

The above process is repeated for each core pack 58 of the stator assembly 34 (shown in FIG. 1B). In various embodiments, in order to retain each composite heat pipe assembly 46 in place, each composite heat pipe assembly 46 can be brazed, or affixed with good thermal contact in any other suitable manner, to respective stator core pack 58.

In operation, heat is removed from each respective stator coil and/or slot 38/56 via the evaporator end(s) 126A of the heat pipe(s) 126 and transferred to the condenser end(s) 126B. More specifically, the heat pipe(s) 126 of each composite heat pipe assembly 46 directly absorb(s) the heat as it is generated in the respective coil 38. Subsequently, the heat transferred to the heat pipe condenser end(s) 126B is removed from the heat pipe condenser end(s) 126B via the cooling air flowing through the fins 134 of cooling fin array 130.

As described above, in various embodiments, the composite heat pipe system 42 can include a plurality of spacers 124 disposed within the stator vents 30. The spacers 124 are structured and operable to maintain a constant height of the respective stator vent 30, i.e., a constant space between adjacent core packs 58. To provide additional illustration of the cooling air flow, FIG. 5B shows a section of the rotor 14 and the respective rotor vent 26, and a plurality of the rotor bars 106 disposed on the rotor 14.

Referring now to FIGS. 6A and 6B, in various embodiments, the slot portion 50 of each radial vent composite heat pipe assembly 46 (generically described with regard to FIGS. 1A, 1B, 2A and 2B), comprises one or more L-shaped heat pipes 138 having a slot leg 140 and a vent leg 142. In such embodiments, the slot leg(s) 140 comprise(s) the evaporator end(s) 138A of the L-shaped heat pipes 138, and the vent leg(s) 142 comprise(s) the condenser end(s) 138B. Although the L-shaped heat pipe(s) 138 is/are exemplarily illustrated in FIGS. 6A and 6B as having an elongated L-shaped square bar shape, it should be noted that it is envisioned that the elongated L-shaped square bar heat pipe(s) 138 shown in FIGS. 6A and 6B can be illustrative of a single L-shaped square bar shaped heat pipe 138, or illustrative of a plurality of L-shaped heat pipes 138 having a square bar shape, a cylindrical shape or any other suitable shape, or illustrative of a plurality of L-shaped heat pipes 126 enclosed within an L-shaped square bar outer body. Additionally, in such embodiments, the vent portion 54 of each radial vent composite heat pipe assembly 46 (generically described with regard to FIGS. 1A, 1B, 2A and 2B) comprises a cooling fin array 142 including a plurality of cooling fins 146 that are brazed (or otherwise attached with good thermal contact) to the condenser end 138B of the L-shaped heat pipe(s) 138 (which form(s) the heat pipe condenser end(s) 62B of the generic embodiment shown in FIG. 2A).

As illustrated in FIG. 6B, to implement the radial vent composite heat pipe system 42 comprising the embodiment of the composite heat pipe assembly 46 shown and described with regard to FIG. 6A, the slot leg(s)/evaporator end(s) 140/138A of the L-shaped heat pipe(s) 138 is/are disposed within and along an end wall of a respective stator slot 56 such that one side of the slot leg(s)/evaporator end(s) 140/138A is/are in thermal contact with the stator core iron and the opposing side(s) is/are in thermal contact with the respective coil 38. As will be easily and readily understood by one skilled in the art, the coils 38 are disposed within the stator slots 56 after the composite heat pipe assemblies 46 are disposed within the stator slots 56 and stator vents 30 as described herein.

As the slot leg(s)/evaporator end(s) 140/138A of the L-shaped heat pipe(s) 138 of each composite heat pipe assembly 46 is/are disposed within the respective stator slot 56, the vent leg(s) 142 cooling fin array 142 is disposed along the top surface (with regard to the orientation of the stator core pack 58 shown in FIG. 6B) of the body 98 the respective stator core pack 58 adjacent one of the respective stator core pack fingers 94. Importantly, the cooling fin array 142 of each composite heat pipe assembly 46 is disposed within the respective radial stator vent 30 formed between the adjacent stator core packs 58. Moreover, the cooling fin array 142 is disposed and oriented within the respective stator vent 30 such that the cooling air will flow between the respective cooling fins 146. Although FIG. 6B only exemplarily shows air flowing through two of the cooling fin arrays 142, it should be understood that during operation of the electric machine 10 the cooling air will flow through the cooling fin arrays 142 of every composite heat pipe assembly 46 of the composite heat pipe system 42 (shown in FIGS. 1A and 1B).

The above process is repeated for each core pack 58 of the stator assembly 34 (shown in FIG. 1B). In various embodiments, in order to retain each composite heat pipe assembly 46 in place, each composite heat pipe assembly 46 can be brazed, or affixed with good thermal contact in any other suitable manner, to respective stator core pack 58.

In operation, heat is removed from each respective stator coil and/or slot 38/56 via the slot leg(s)/evaporator end(s) 140/138A of the L-shaped heat pipe(s) 138 and transferred to the vent leg(s)/condenser end(s) 142/138B. More specifically, the heat pipe(s) 138 of each composite heat pipe assembly 46 directly absorb(s) the heat as it is generated in the respective coil 38. Subsequently, the heat transferred to the heat pipe vent leg(s)/condenser end(s) 142/138B is removed from the heat pipe vent leg(s)/condenser end(s) 142/138B via the cooling air flowing through the fins 146 of cooling fin array 142.

As described above, in various embodiments, the composite heat pipe system 42 can include a plurality of spacers 124 disposed within the stator vents 30. The spacers 124 are structured and operable to maintain a constant height of the respective stator vent 30, i.e., a constant space between adjacent core packs 58. To provide additional illustration of the cooling air flow, FIG. 4B shows a section of the rotor 14 and the respective rotor vent 26, and a plurality of the rotor bars 106 disposed on the rotor 14.

In accordance with the various embodiments of the radial vent composite heat pipe system 42 described above, there are several benefits described herein. For example, heat is moved far away from the coils 38, that is, it is moved from a radial inside diameter of the stator assembly 34 (e.g., the stator coil end) to the outside diameter of the stator assembly 34 and the temperature of the stator core is not thermally limited, whereas the stator coils 38 have a maximum temperature limit that must be adhered to. Additionally, the heat transferred from the stator coils 38 is greatly enhanced. Via the radial vent composite heat pipe system 42, heat throughout the full stator coil area is transferred via highly conductive heat pipes (e.g., heat pipes 62, 86, 90, 114, 126 and 138) to the air stream flowing through the stator vents 30.

Furthermore, Heat is rejected from the coil along a longer length, e.g. 1.75 inches, as compared to being rejected to an air stream for a shorter length, (e.g., 0.5" as in traditional electric machines). Therefore, the thermal resistance of the heat rejection path is much less as it is transferred via highly conductive heat pipes (e.g., heat pipes 62, 86, 90, 114, 126 and 138) as opposed to multiple, insulated steel plates, as is known in the stator core or int the core packs 58. Still further, the cooling fins of the various embodiments of composite heat pipe assemblies 46 described above (e.g., cooling fins 66, 84, 122, 134 and 146) greatly increase the surface area contacted by the cooling air which facilitates the heat transfer from the heat pipe assemblies 46 to the cooling air. This surface area depends on the fin density (fins per inch), but can compare very favorably to the area of the exposed coil section in the air gap section of a traditional electric machine.

As described above, the radial vent composite heat pipe system 42 is integrated as part of the overall design of the electric machine 10. In addition, the radial vent composite heat pipe system 42 can be disposed within the radial stator vents found in traditional electric machines. Hence, the air flows through the cooling fins (e.g., cooling fins 66, 84, 122, 134 and 146) of each radial vent composite heat pipe assembly 46 just as it does in a traditional radial stator vent. However, with the implementation of a radial vent composite heat pipe system 42, as described above, the thermal resistance from the stator coils 38 to the cooling air is much lower than with a traditional radial vent machines.

As a result, a greater amount of heat can be removed from the stator coils 38 for any given difference in temperature rise in the electric machine 10, comprising the radial vent composite heat pipes system 42, than in known electrical machines. This in turn translates to greater potential power density. From a manufacturing perspective the electric machine 10 comprising the radial vent composite heat pipe system 42 is built similarly to a traditional machine. However, instead of inserting the traditional radial air vents, the radial vent composite heat pipe system 42 is implemented.

Although the radial vent heat pipe system 42 has been described herein as being implemented in a stator assembly (i.e., the stator assembly 34), it is envisioned that the radial vent heat pipe system 42, can also be implemented in a rotor assembly of any given wound rotor electrical machine.

Additionally, it is further envisioned that the radial vent heat pipe system 42 can be implemented to rapidly and efficiently cool transformer windings. In such implementations, the radial vent composite heat pipe system 42 would not be a 'radial vent' but would be appropriately configured to remove heat directly from the rotor winding or transformer winding coil to an area where the heat could be directly rejected to external cooling air.

Still further, although the embodiments described herein have been described wherein the slot portions 50 include heat pipes to transfer the heat from the stator coil and/or slot 38/56, it is envisioned that in various embodiments, the heat pipes in the slot portions 50 can be replace with thermally conductive structures, e.g., copper, aluminum, etc., plates and/or bars that are thermally connected to the vent portions 54.

The description herein is merely exemplary in nature and, thus, variations that do not depart from the gist of that which is described are intended to be within the scope of the teachings. Such variations are not to be regarded as a departure from the spirit and scope of the teachings.

What is claimed is:

1. A radial vent composite heat pipe system for cooling and increasing the power density of an electrical machine, said system comprising a plurality of radial vent composite heat pipe assemblies, wherein each heat pipe assembly comprises:
   a slot portion disposable within a respective one of a plurality of stator slots of a stator core pack of a stator assembly of an electrical machine; and
   a vent portion thermally connected to the slot portion and disposable within a respective one of a plurality of stator vents of the stator assembly, wherein:
   the slot portion of each heat pipe assembly is structured and operable to absorb heat from a respective one of a plurality of stator coils of the stator assembly and transfer the absorbed heat to the respective vent portion, and
   the vent portion of each heat pipe assembly is structured and operable to reject the transferred heat from the slot portion of the respective heat pipe assembly into a cooling air flowing through the respective stator vent, thereby rapidly transferring heat from the respective stator coil to the cooling air flowing through stator vent.

2. The system of claim 1, wherein the slot portion of each heat pipe assembly comprises at least one heat pipe having an evaporator end and a condenser end to which the vent portion is thermally connected.

3. The system of claim 2, wherein the vent portion of each heat pipe assembly comprises a plurality of cooling fins thermally connected to the respective condenser end of the at least one heat pipe.

4. The system of claim 3, wherein the slot portion of each heat pipe assembly comprises a two-part slot portion comprising a first heat pipe section thermally connected to a second heat pipe section, where:
   the first heat pipe section comprises at least one heat pipe; and the second heat pipe section comprises at least one heat pipe, wherein the condenser end of the first heat pipe section at least one heat pipe is thermally connected to evaporator end of the second heat pipe section at least one heat pipe, and the slot portion is thermally connected to the condenser end of the second heat pipe section at least one heat pipe.

5. The system of claim 4, wherein the vent portion of each heat pipe assembly comprises a two-part vent portion comprising a first cooling fin array and a second cooling fin array, each thermally connected to the condenser end of the second heat pipe section at least one heat pipe.

6. The system of claim 3, wherein the slot portion of each heat pipe assembly comprises a heat pipe panel comprising a plurality of the heat pipes and the vent portion is thermally connected to a condenser end of the heat pipe panel.

7. The system of claim 3, wherein the slot portion of each heat pipe assembly comprises at least one L-shaped heat pipe having a slot leg and a vent leg to which the vent portion is thermally connected.

8. A stator assembly for an electrical machine, said stator assembly comprising:
   a plurality of stator core packs assembled together such that a plurality of stator vents are formed between adjacent stator core packs; and
   a radial vent composite heat pipe system disposed partially within a plurality of stator slots of each stator core pack and partially within the stator vents, the radial vent composite heat pipe system comprising:
      a plurality of radial vent composite heat pipe assemblies, wherein each heat pipe assembly comprises:
         a slot portion disposable within a respective one of a plurality of the stator slots; and
         a vent portion thermally connected to the slot portion and disposable within a respective one of the stator vents, wherein:
            the slot portion of each heat pipe assembly is structured and operable to absorb heat from a respective one of a plurality of stator coils of the stator assembly and transfer the absorbed heat to the respective vent portion, and
            the vent portion of each heat pipe assembly is structured and operable to reject the transferred heat from the slot portion of the respective heat pipe assembly into a cooling air flowing through the respective stator vent, thereby rapidly transferring heat from the respective stator coil to the cooling air flowing through stator vent.

9. The stator assembly of claim 8, wherein the slot portion of each heat pipe assembly comprises at least one heat pipe having an evaporator end and a condenser end to which the vent portion is thermally connected.

10. The stator assembly of claim 9, wherein the vent portion of each heat pipe assembly comprises a plurality of cooling fins thermally connected to the respective condenser end of the at least one heat pipe.

11. The stator assembly of claim 10, wherein the slot portion of each heat pipe assembly comprises a two-part slot portion comprising a first heat pipe section thermally connected to a second heat pipe section, where:
   the first heat pipe section comprises at least one heat pipe; and
   the second heat pipe section comprises at least one heat pipe, wherein the condenser end of the first heat pipe section at least one heat pipe is thermally connected to evaporator end of the second heat pipe section at least one heat pipe, and the slot portion is thermally connected to the condenser end of the second heat pipe section at least one heat pipe.

12. The stator assembly of claim 11, wherein the vent portion of each heat pipe assembly comprises a two-part vent portion comprising a first cooling fin array and a second cooling fin array, each thermally connected to the condenser end of the second heat pipe section at least one heat pipe.

13. The stator assembly of claim 10, wherein the slot portion of each heat pipe assembly comprises a heat pipe panel comprising a plurality of the heat pipes and the vent portion is thermally connected to a condenser end of the heat pipe panel.

14. The stator assembly of claim 10, wherein the slot portion of each heat pipe assembly comprises at least one L-shaped heat pipe having a slot leg and a vent leg to which the vent portion is thermally connected.

15. A method for rapidly transferring heat from stator coils of an electrical machine to a cooling air flowing through stator vents to thereby greatly increasing the power density of the electrical machine, said method comprising:
   absorbing heat from a plurality of stator coils of a stator assembly of an electrical machine via a plurality of slot portion of a plurality of radial vent composite heat pipe assemblies disposed within a plurality of stator slots of the stator assembly;
   transferring the absorbed heat to vent portions of each heat pipe assembly that are thermally connected to slot portions, the vent portions disposed within the stator vents; and
   rejecting the transferred heat, via the vent portions, into a cooling air flowing through the stator vents and the vent portions, thereby rapidly transferring heat from the respective stator coil to the cooling air.

16. The method of claim 15, wherein absorbing heat from the plurality of stator coils comprises absorbing the heat via an evaporation end of at least one heat pipe of the slot portion of each heat pipe assembly.

17. The method of claim 16, wherein transferring the absorbed heat to the vent portions of each heat pipe assembly comprises transferring the heat from the evaporator end of each heat pipe of each heat pipe assembly to a condenser end of each heat pipe of each heat pipe assembly.

18. The method of claim 17, wherein rejecting the transferred heat comprises rejecting the transferred heat into the cooling air flow via a plurality of cooling fins of each vent portion of each heat pipe assembly that are thermally connected to the condenser end of each heat pipe of each heat pipe assembly.

* * * * *